(12) United States Patent
Demcko et al.

(10) Patent No.: US 8,699,204 B2
(45) Date of Patent: Apr. 15, 2014

(54) ELEMENT ARRAY AND FOOTPRINT LAYOUT FOR ELEMENT ARRAY

(75) Inventors: Ronald S. Demcko, Raleigh, NC (US); Jeff Cheng, Tianjin (CN); Michael Kirk, Myrtle Beach, SC (US)

(73) Assignee: AVX Corporation, Fountain Inn, SC (US)

( * ) Notice: Subject to any disclaimer, the term of this patent is extended or adjusted under 35 U.S.C. 154(b) by 433 days.

(21) Appl. No.: 13/032,042

(22) Filed: Feb. 22, 2011

(65) Prior Publication Data

US 2011/0205725 A1    Aug. 25, 2011

Related U.S. Application Data

(60) Provisional application No. 61/307,141, filed on Feb. 23, 2010.

(51) Int. Cl.
| | |
|---|---|
| *H01G 4/228* | (2006.01) |
| *H01G 4/005* | (2006.01) |
| *H01G 4/232* | (2006.01) |
| *H01G 4/30* | (2006.01) |

(52) U.S. Cl.
CPC .............. *H01G 4/005* (2013.01); *H01G 4/228* (2013.01); *H01G 4/232* (2013.01); *H01G 4/30* (2013.01)
USPC .................. 361/306.1; 361/301.2; 361/301.4; 361/305; 361/306.3; 361/312

(58) Field of Classification Search
CPC ....... H01G 4/005; H01G 4/228; H01G 4/232; H01G 4/30
USPC ........ 361/306.1, 311–313, 305, 301.2, 301.4, 361/306.2
See application file for complete search history.

(56) References Cited

U.S. PATENT DOCUMENTS

| | | | |
|---|---|---|---|
| 5,590,016 | A | 12/1996 | Fuhishiro et al. |
| 6,234,253 | B1 | 5/2001 | Dallas |
| 6,243,253 | B1 | 6/2001 | DuPre et al. |
| 6,292,350 | B1 | 9/2001 | Naito et al. |
| 6,324,048 | B1 | 11/2001 | Liu |
| 6,515,842 | B1 | 2/2003 | Hayworth et al. |
| 7,149,072 | B2 * | 12/2006 | Lee et al. ................ 361/307 |

* cited by examiner

*Primary Examiner* — Nguyen T Ha
(74) *Attorney, Agent, or Firm* — Dority & Manning, P.A.

(57) ABSTRACT

An element array and a footprint layout for an element array are disclosed. The element array can have a rectangular configuration defining two side surfaces and two end surfaces. The element array can include a plurality of stacked dielectric-electrode layers. One dielectric-electrode layer can include a plurality of element electrodes, such as eight element electrodes. Each of the plurality of element electrodes forms a part of an individual element for the element array. The element array device can further include a common electrode. The common electrode is used as part of each of the individual elements for the element array. The common electrode can include a lead for termination to one of the two end surfaces of the element array or, in a particular embodiment, to one of the two side surfaces of the element array.

11 Claims, 8 Drawing Sheets

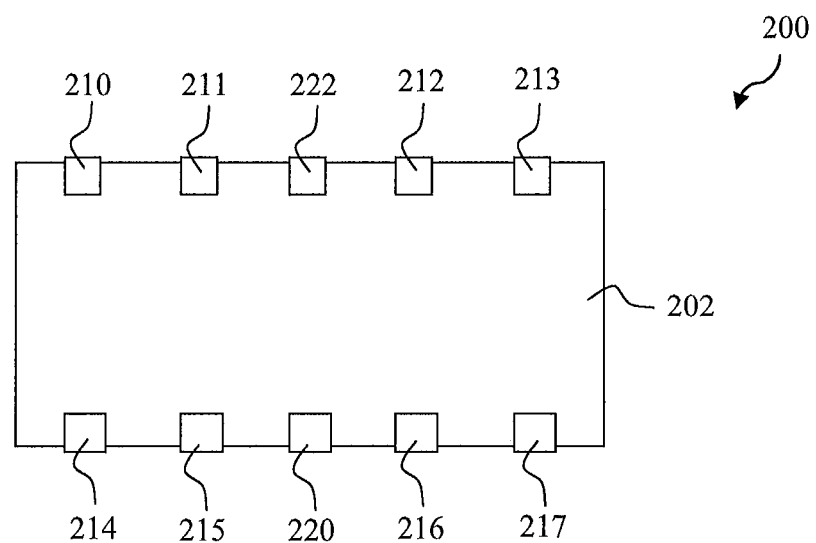
Figure 7
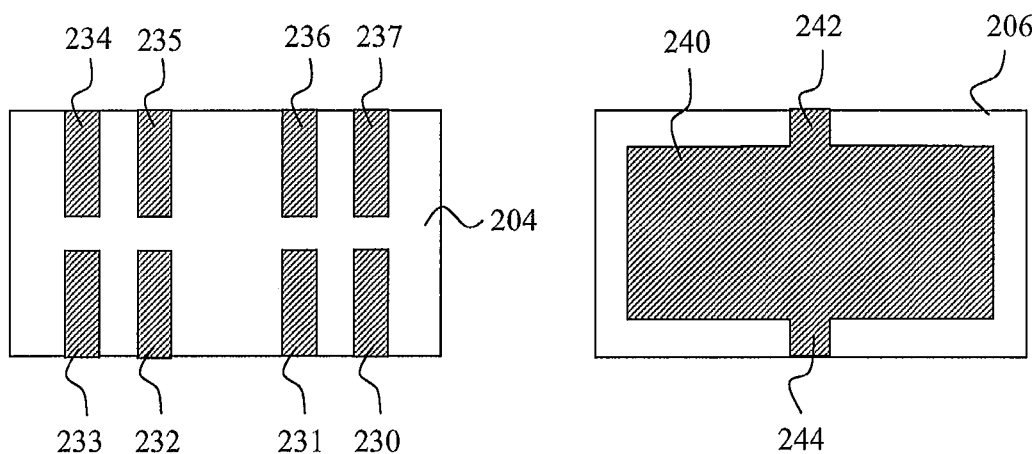
Figure 8
Figure 9

ELEMENT ARRAY AND FOOTPRINT LAYOUT FOR ELEMENT ARRAY

PRIORITY CLAIM

The present application claims the benefit of priority of U.S. Provisional Patent Application Ser. No. 61/307,141, filed Feb. 23, 2010, which is incorporated herein by reference for all purposes.

BACKGROUND OF THE INVENTION

The present subject matter generally relates to electronic components adapted to be mounted on a circuit board and more particularly to a multi-element array, such as a capacitor array or a varistor array, and relates to a footprint layout for such multi-element array for use in a variety of applications.

For some time, the design of various electronic components has been driven by a general industry trend toward miniaturization. In this regard, a need exists for ever smaller electronic components having exceptional operating characteristics. For example, some applications require a large capacitance value, but are severely limited in the amount of space such electronic components may occupy on a circuit board.

Multilayer ceramic devices, such as multilayer ceramic capacitors or varistors, are typically constructed with a plurality of dielectric-electrode layers arranged in a stack. During manufacture, the layers may often be pressed and formed into a vertically stacked structure. Multilayer ceramic devices can include a single element or multiple elements in an array. Exemplary multilayer ceramic devices are disclosed in U.S. Pat. Nos. 6,515,842; 6,324,048; 6,292,350; 6,243,253; 6,234,253; and 5,590,016. The above referenced patents are hereby incorporated by reference into this disclosure for all purposes, and as if fully set forth herein.

With desires to increase functionality and reduce the amount of space occupied by electronic components on a circuit board, manufacturers are seeking ways to provide more elements in multilayer ceramic devices while maintaining a small footprint for a multilayer ceramic device. In addition, adequate termination structures for connection of the multilayer ceramic devices to external circuitry must also be provided.

Thus, an element array and a footprint layout for an element array that allows for an increased number of elements in a small amount of space that can be manufactured efficiently and provides for adequate termination structures for connection to external circuitry would be desirable.

SUMMARY OF THE INVENTION

In view of the recognized features encountered in the prior art and addressed by the present subject matter, an improved element array and footprint layout for an element array are presently disclosed.

In one exemplary configuration, an electronic component is disclosed that includes an element array that can be mounted to a printed circuit board.

In accordance with certain aspects of certain embodiments of the present subject matter, a present exemplary element array may include a plurality of elements, such as a plurality of capacitors, varistors, or resistors, in a relatively small size multilayer ceramic chip.

In accordance with yet additional aspects of certain embodiments of the present subject matter, an exemplary element array may include such as eight separate elements in a relatively small size multilayer ceramic chip, such as a 1206 multilayer ceramic chip.

In accordance with yet additional aspects of certain embodiments of the present subject matter, the element array includes a varistor array that provides for both differential mode and common mode transient voltage surge protection.

In accordance with yet additional aspects of certain embodiments of the present subject matter, an improved footprint layout is disclosed for providing for more efficient application and location of termination structures to an element array.

One exemplary embodiment of the present disclosure is directed to an element array for mounting to a circuit board. The element array has a rectangular configuration defining first and second opposing side surfaces and first and second opposing end surfaces. The element array includes at least one dielectric layer and a plurality of stacked dielectric-electrode layers. The plurality of stacked dielectric-electrode layers includes a first dielectric-electrode layer and a second dielectric-electrode layer. The first dielectric-electrode layer can include a plurality of element electrodes. Each of the element electrodes forms a part of an individual element for the element array. Each of the plurality element electrodes further includes a lead for termination to one of the first and second opposing side surfaces of the element array.

Another exemplary embodiment of the present disclosure is directed to a rectangular element array having first and second opposing side surfaces and first and second opposing end surfaces. The element array includes at least one dielectric layer and at least one dielectric-electrode layer. The at least one dielectric-electrode layer comprises a plurality of element electrodes. Each of the element electrodes forms a part of an individual element for the element array. Each of the element electrodes includes a lead for termination to one of the first and second opposing side surfaces of the element array. The element array further includes a plurality of termination structures coupled to the leads of the element electrodes. The termination structures are located on one of the first and second side surfaces of the element array.

A further exemplary embodiment is directed to a multi-element varistor array. The multi-element varistor array includes a top dielectric layer, a bottom dielectric layer, and a plurality of stacked dielectric-electrode layers disposed between the dielectric layer and the bottom dielectric layer. The plurality of stacked dielectric-electrode layers are formed at least in part from zinc oxide. The plurality of stacked dielectric-electrode layers includes a first dielectric-electrode layer and a second dielectric-electrode layer. The first dielectric-electrode layer includes a plurality of electrodes forming a part of individual varistors for said varistor array. The second dielectric-electrode layer comprising a common electrode for said varistor array. During a voltage transient, current flows between one of the plurality of electrodes on the first dielectric-electrode layer and the common electrode, thereby providing transient voltage surge protection.

Additional aspects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures).

Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 7 depicts a top plan view of an element array according to an exemplary embodiment of the present disclosure;

FIG. 8 depicts a top plan view of an exemplary dielectric-electrode layer of an element array according to an exemplary embodiment of the present disclosure;

FIG. 9 depicts a top plan view of an exemplary dielectric-electrode layer of an element array according to an exemplary embodiment of the present disclosure;

Figure 1:
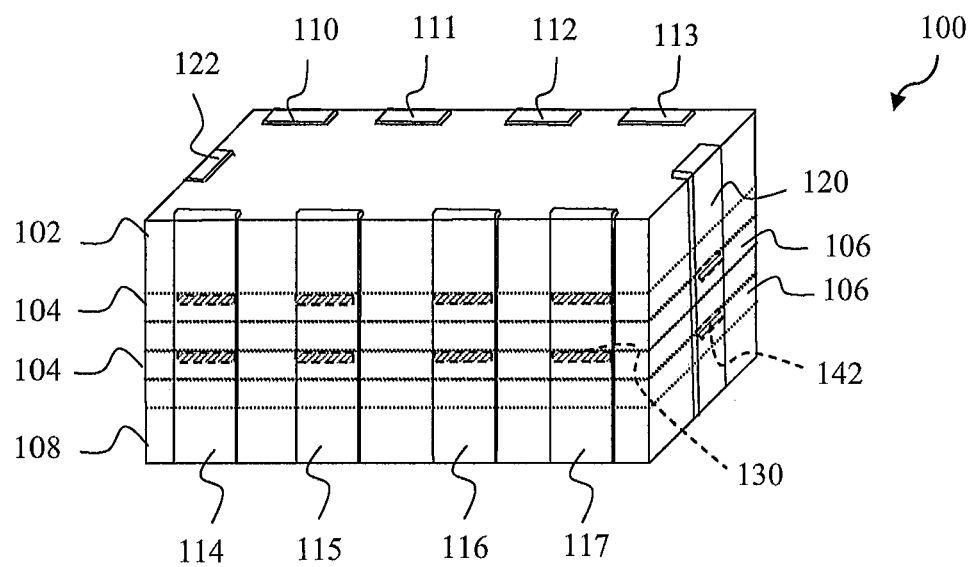
FIG. 1 depicts a perspective view of an element array according to an exemplary embodiment of the present disclosure.

Repeat use of reference characters throughout the present specification and appended drawings is intended to represent same or analogous features, elements, or steps of the present subject matter.

DETAILED DESCRIPTION OF THE PREFERRED EMBODIMENTS

It is to be understood by one skilled in the art that the present disclosure is a description of exemplary embodiments only, and is not intended as limiting the broader aspects of the present subject matter, which broader aspects are embodied in the exemplary constructions.

Generally, the present disclosure is directed to an element array and a footprint layout for an element array that can be mounted to a circuit board. The element array can have a rectangular configuration defining two side surfaces and two end surfaces. The element array can include a plurality of stacked dielectric-electrode layers that includes at least one first dielectric-electrode layer and at least one second dielectric-electrode layer. The first dielectric-electrode layer can include a plurality of element electrodes, such as eight element electrodes. Each of the plurality of element electrodes forms a part of an individual element for the element array. For example, each of the plurality of element electrodes can form a part of an individual capacitor, varistor, resistor, or other suitable element of the element array. Each of the plurality of element electrodes has a separate lead for termination to one of the two side surfaces of the element array.

The second dielectric-electrode layer can include a common electrode. The common electrode can form a part of each of the individual elements for the multi-element array. For example, in a particular embodiment, the common electrode can act as a shared capacitor plate for each of the plurality of element electrodes. The common electrode can include a lead for termination to one of the two end surfaces of the multi-element array or, in a particular aspect of the present subject matter, to one of the two side surfaces of the element array. This exemplary design can allow for an increased number of elements to be included in the element array without necessarily resulting in an increased size for the element array.

In another particular implementation, the present subject matter is directed to a rectangular element array that includes two side surfaces and two end surfaces. The element array can include a plurality of generally planar stacked dielectric-electrode layers. The dielectric-electrode layers can include electrodes that can each be used as part of an individual element for the element array, such as part of an individual capacitor, varistor, resistor, or other suitable element. Each of the electrodes can have at least one lead for termination to one of the two sides of the element array. Because electrodes in the element array are terminated to one of two sides of the element arrays, termination structures can be more efficiently applied to element array when compared to element arrays that require termination structures on all four sides of the element array.

Figure 2:
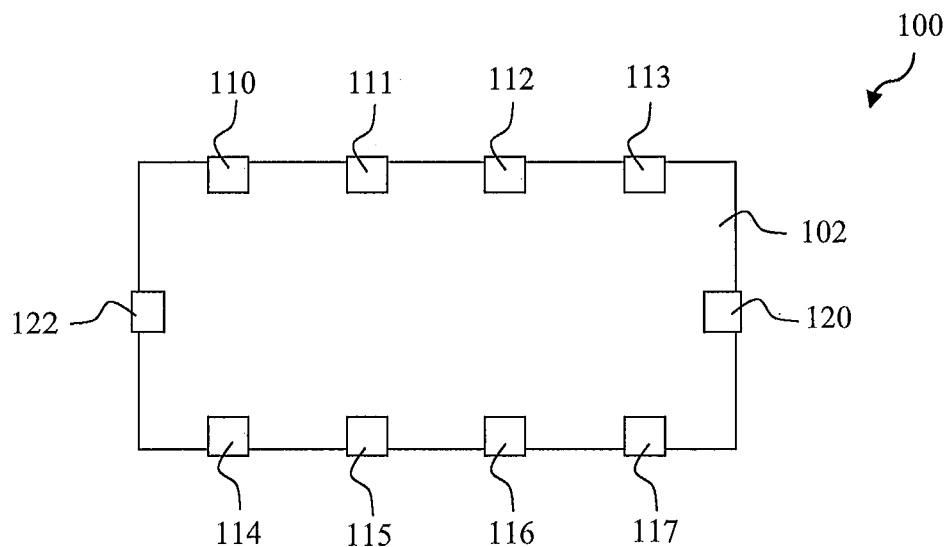
FIG. 2 depicts a top plan view of an element array according to an exemplary embodiment of the present disclosure.

Referring now to the Figures, exemplary embodiments of the present disclosure will now be discussed in detail. FIG. 1 provides a perspective view of a present exemplary element array generally 100 that can be mounted such as to a printed circuit board. FIG. 2 provides a top plan view of representative element array 100. Element array 100 can be a multilayer capacitor array, multilayer varistor array, a multilayer resistor array, or other suitable element array.

Element array 100 generally has a rectangular configuration having two side surfaces and two end surfaces. As will be readily understood by those of ordinary skill in the art, the external dimensions of element array 100 can generally be expressed as a number "XXYY," with XX and YY being the width or length in hundredths of an inch. Some typical sizes may include 1206, 1012, 0508, 0306, and 1218. In one exemplary embodiment of the present disclosure, a plurality of elements, such as a plurality of capacitors, varistors, or resistors, are included in a size 1206 element array 100. For instance, in a particular embodiment, eight individual elements, such as eight individual capacitors, varistors, or resistors, are included in a 1206 element array 100. Element array 100 can have a low aspect ratio, defined as the ratio of the height to the longer of the width or the length. For instance, in a particular embodiment, element array 100 can have an aspect ratio of less than 1:1, such as less than 0.5:1.

Element array 100 includes a plurality of generally planar dielectric layers made of, for example, a ceramic dielectric material. The dielectric layers can include any suitable dielectric material, such as, for instance, barium titinate, zinc oxide, or other suitable dielectric material. The dielectric layers can be pressed together and sintered to form a unitary structure element array 100.

Representative element array 100 of FIG. 1 may include a top dielectric layer 102, a bottom dielectric layer 108, and a plurality of alternating dielectric-electrode layers 104 and 106. While element array 100 includes only a single dielectric layer as top dielectric layer 102 and a single dielectric layer as bottom dielectric layer 108, those of ordinary skill in the art, using the disclosures provided herein, should understand that any number of top or bottom dielectric layers can be used without deviating from the scope of the present disclosure. Similarly, while element array 100 includes four layers of alternating dielectric-electrode layers 104 and 106, those of ordinary skill in the art, using the disclosures provided herein, should also understand that the present disclosure is not limited to any particular number of dielectric-electrode layers. For instance, in a particular embodiment, element array 100 can include two dielectric-electrode layers, four dielectric-electrode layers, eight dielectric electrode layers, ten dielectric-electrode layers, twenty dielectric-electrode layers, thirty dielectric-electrode layers, or any other suitable number of dielectric-electrode layers.

Element array 100 includes a plurality of respective termination structures 110, 111, 112, 113, 114, 115, 116, 117, 120, and 122 for coupling the internal electrodes of element array 100 to a printed circuit board. Termination structures 110, 111, 112, 113, 114, 115, 116, 117, 120, and 122 can include a metallization layer of platinum, copper, palladium silver, or other suitable conductor material. A chromium/nickel layer, followed by a silver/lead layer, applied by typical processing techniques such as sputtering, can be used as an outer conductive layer for the termination structures 110, 111, 112, 113, 114, 115, 116, 117, 120, and 122.

Figure 3:
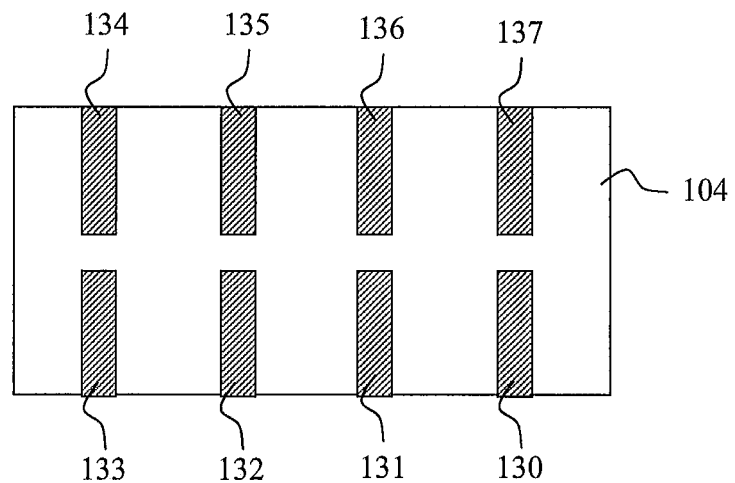
FIG. 3 depicts a top plan view of an exemplary dielectric-electrode layer of an element array according to an exemplary embodiment of the present disclosure.
Figure 4:
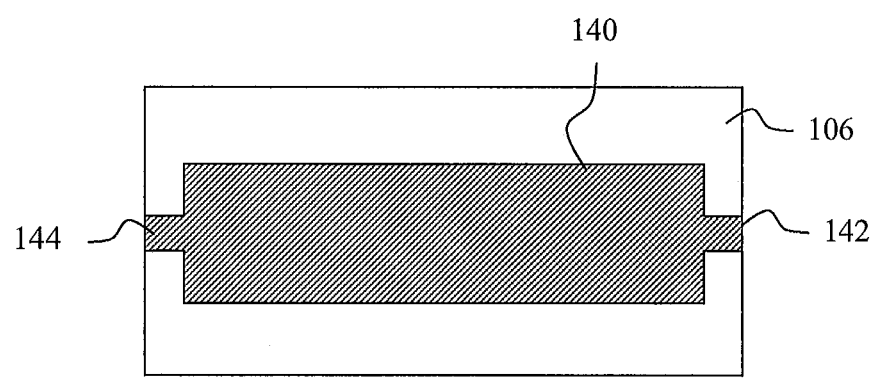
FIG. 4 depicts a top plan view of an exemplary dielectric-electrode layer of an element array according to an exemplary embodiment of the present disclosure.

With reference to FIGS. 3 and 4, the internal electrode structure of element array 100 will now be discussed in detail. As shown in FIG. 3, representative dielectric-electrode layer 104 may include eight electrodes 130, 131, 132, 133, 134, 135, 136, and 137. Each electrode can be formed from a palladium, silver, platinum, copper, or other suitable conductor capable of being printed on dielectric layer 104. Each electrode 130, 131, 132, 133, 134, 135, 136, and 137 forms a part of an element, such as part of a capacitor, varistor, or resistor, of element array 100. For instance, in a particular embodiment, each electrode 130, 131, 132, 133, 134, 135, 136, and 137 may form a capacitor plate of one of eight individual capacitors of element array 100.

Each electrode 130, 131, 132, 133, 134, 135, 136, and 137 has a separate lead for termination to one of the two sides of array device 100. As shown in FIG. 1, the termination structures 110, 111, 112, 113, 114, 115, 116, and 117 each are respectively coupled to one of electrodes 130, 131, 132, 133, 134, 135, 136, and 137 to provide a structure for individual coupling of each one of electrodes 130, 131, 132, 133, 134, 135, 136, and 137 to a circuit board.

As shown in FIG. 4, representative dielectric-electrode layer 106 may include a common electrode 140. Common electrode 140 can be formed from a palladium silver, platinum, copper, or other suitable conductor capable of being printed on dielectric layer 106. Common electrode 140 can form a part of each of the individual elements of element array 100. Common electrode 140 includes two leads 142 and 144 for termination to one of the two end surfaces of element array 100. As represented in FIG. 1, the termination structures 120 and 122 may be each coupled to one of electrode leads 142 and 144 so as to provide a structure for coupling common electrode 140 to a circuit board.

In one exemplary embodiment of the present disclosure, common electrode 140 can form an opposing capacitor plate for each of electrodes 130, 131, 132, 133, 134, 135, 136, and 137. When dielectric-electrode layer 104 is placed to overlap dielectric-electrode layer 106, eight separate capacitors are formed in element array 100. The eight separate capacitor elements each include one of electrodes 130, 131, 132, 133, 134, 135, 136, and 137 located on dielectric-electrode layer 104 and common electrode 140 on dielectric-electrode layer 106.

In another exemplary embodiment, element array 100 can be a varistor array. The varistor array can provide for transient voltage surge protection by providing clamping voltage capabilities. Element array 100 includes eight separate varistors. Each varistor includes one of electrodes 130, 131, 132, 133, 134, 135, 136, and 137 located on dielectric-electrode layer 104 and common electrode 140 on dielectric-electrode layer 140. The dielectric material of the dielectric-electrode layers 104 and 106 can be formed from zinc oxide. As a voltage transient or voltage surge occurs, current can flow between two or more of electrodes 130, 131, 132, 133, 134, 135, 136, and 137 or between one of electrodes 130, 131, 132, 133, 134, 135, 136, and 137 and common electrode 140 of the element array 100. This can prevent current from flowing to one or more other components of a circuit board, protecting other components on the circuit board from damage. In this manner, element array 100 according to this exemplary embodiment can provide for both differential mode and common mode transient voltage surge protection.

Figure 5:
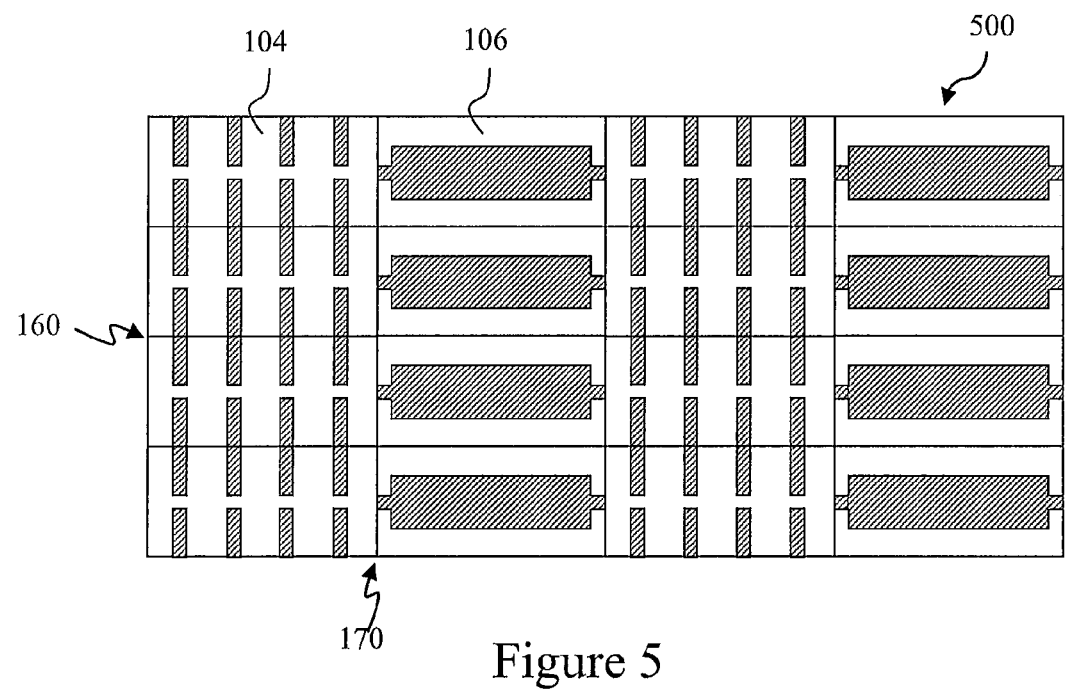
FIG. 5 depicts a plan view of an exemplary pattern of a plurality of exemplary dielectric-electrode layers of an element array according to an exemplary embodiment of the present disclosure before the plurality of dielectric-electrode layers have been separated such as by a guillotine dicing process.

FIG. 5 depicts an exemplary panel layout for the manufacture of a plurality of dielectric-electrode layers 104 and 106 from a single sheet generally 500 of dielectric material. The electrodes of dielectric-electrode layers 104 and 106 can be printed on sheet 500 of dielectric material using any suitable printing technique. The individual dielectric-electrode layers 104 and 106 can be separated from one another through, for instance, a guillotine dicing process. The guillotine can be configured to dice the laminated sheet 500 such as along lines 160 and 170 to separate the individual dielectric-electrode layers 104 and 106. The separated dielectric layers 104 and 106 can then be stacked, pressed, and sintered so as to form element array 100.

Examples of such exemplary embodiment of the present disclosure include as follows.

Example 1

In this example, a 1206 eight varistor array was constructed as shown and described above with reference to FIGS. 1-5. The varistor array included two top dielectric layers, thirty layers of alternating dielectric-conductor layers, and one bottom dielectric layer. Each dielectric layer was about 2.9 mils thick. With current at 1 A, the clamping voltage was about 44.68 V. The breakdown voltage was about 24.2 V at 1 mA. At 18 V the maximum leakage current was about 0.235 µA. The average capacitance was about 64.41 pF at 1 MHz and 0.5 V.

Example 2

In this example, a 1206 eight varistor array was constructed as shown and described above with reference to FIGS. 1-5. The varistor array included seven top dielectric layers, twenty layers of alternating dielectric-conductor layers, and six bottom layers. Each dielectric layer was about 2.9 mils thick. With current at 1 A, the clamping voltage was about 48.52 V. The breakdown voltage was about 26.75 V at 1 mA. At 18V the maximum leakage current was about 0.034 µA. The average capacitance was about 45.56 pF at 1 MHz and 0.5 V.

Example 3

In this example, a 1206 eight varistor array was constructed as shown and described above with reference to FIGS. 1-5. The varistor array included twelve top dielectric layers, ten layers of alternating dielectric-conductor layers, and eleven bottom layers. Each dielectric layer was about 2.9 mils thick. With current at 1 A, the clamping voltage was about 48.17 V. The breakdown voltage was about 25.04 V at 1 mA. At 18V the maximum leakage current was about 0.035 µA. The average capacitance was about 33.46 pF at 1 MHz and 0.5 V.

Figure 6:
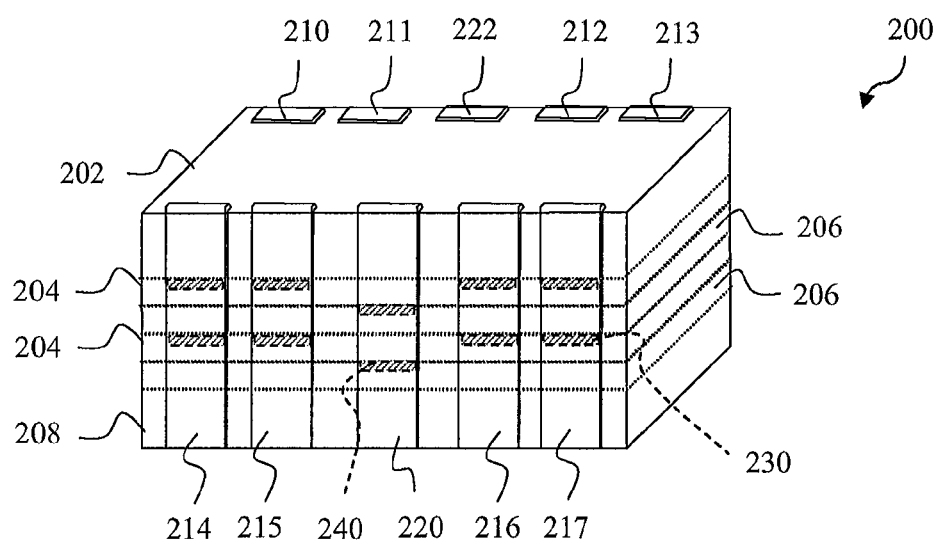
FIG. 6 depicts a perspective view of an element array according to an exemplary embodiment of the present disclosure.

Referring now to FIGS. 6-17, another exemplary embodiment of the present disclosure is discussed in detail. FIG. 6 provides a perspective view of an exemplary element array 200 that can be mounted to a printed circuit board. FIG. 7 provides a top plan view of element array 200. Element array 200 can be a capacitor array, a varistor array, a resistor array, or other suitable array.

Element array 200 includes a plurality of generally planar dielectric layers made of, for example, a ceramic dielectric material. The dielectric layers can include any suitable dielectric material, such as, for instance, barium titinate, zinc oxide, or other suitable dielectric material. The dielectric layers can be pressed together and sintered to form a unitary structure element array 200.

Element array 200 of FIG. 6 includes representative top dielectric layer 202, bottom dielectric layer 208, and plural alternating dielectric-electrode layers 204 and 206. While element array 200 includes only a single dielectric layer as top dielectric layer 202 and a single dielectric layer as bottom dielectric layer 208, those of ordinary skill in the art, using the disclosures provided herein, should understand that any number of top or bottom dielectric layers can be used without deviating from the scope of the present disclosure. Similarly, while element array 200 includes four layers of alternating dielectric-electrode layers 204 and 206, those of ordinary skill in the art, using the disclosures provided herein, should also understand that the present disclosure is not limited to any particular number of dielectric-electrode layers.

Element array 200 includes a plurality of termination structures 210, 211, 212, 213, 214, 215, 216, 217, 220, and 222 for respectively coupling the internal electrodes of array device 200 to a printed circuit board. The number of termination structures can vary depending on the number of elements in element array 200. For instance, in representative FIG. 6, ten termination structures are illustrated for an eight element array device. However, fewer termination structures may be necessary for element arrays with fewer than eight elements. For instance, only six termination structures may be necessary for a four element array device.

As illustrated, termination structures 210, 211, 212, 213, 214, 215, 216, 217, 220 and 222 are all located on one of the two side surfaces of element array 200. The end surfaces of element array 200 do not include any termination structures. As will be discussed in detail below, such is because the footprint layout for the internal electrodes of element array 200 are configured such that termination structures are only needed at the two side surfaces of element array 200 and not at the two end surfaces of element array 200.

By limiting the location of the termination structures 210, 211, 212, 213, 214, 215, 216, 217, 220, and 222 to the two side surfaces, the termination structures can be more efficiently applied to element array 200. For example, only the two side surfaces of element array 200 need to be metalized or striped with a conductor material, such as platinum, copper, palladium silver, or other suitable conductor material. Moreover, it is easier to apply termination structures to the two larger side surfaces of element array 200 as opposed to the two smaller end surfaces of element array 200. In such regard, the element array 200 according to this exemplary embodiment of the present disclosure provides for more efficient manufacturing and production of element arrays.

FIGS. 8 and 9 show exemplary respective dielectric-electrode layers 204 and 206 that can be used in an eight element array according to an exemplary embodiment of the present disclosure. Layer 204 includes a dielectric substrate having eight electrodes 230, 231, 232, 233, 234, 235, 236, and 237 thereon. Each electrode 230, 231, 232, 233, 234, 235, 236, and 237 can form a part of an element, such as part of a capacitor, varistor, or resistor, of element array 200. Each respective electrode 230, 231, 232, 233, 234, 235, 236, and 237 includes a lead for termination to one of the two side surfaces of layer 204. Layer 206 includes a dielectric substrate with a common electrode 240 thereon. Common electrode 240 can form a part of each of the individual elements of element array 200. For instance, in a particular embodiment, common electrode 240 can form an opposing capacitor plate for each of respective electrodes 230, 231, 232, 233, 234, 235, 236, and 237. Common electrode 240 similarly includes leads 242 and 244 for termination to one of the two side surfaces of layer 206.

Figure 10:
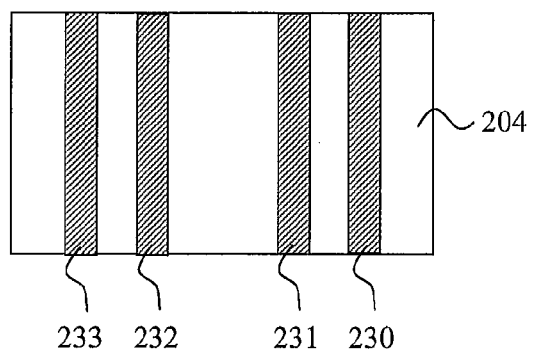
FIG. 10 depicts a top plan view of an exemplary dielectric-electrode layer of an element array according to an exemplary embodiment of the present disclosure.
Figure 11:
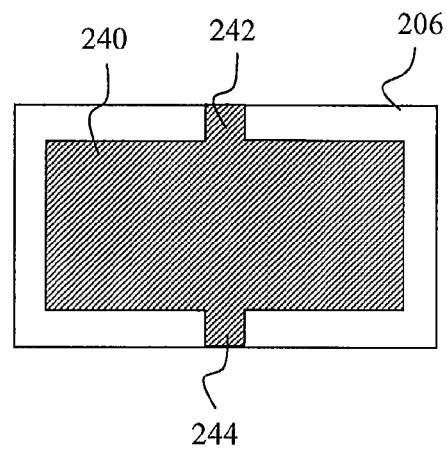
FIG. 11 depicts a top plan view of an exemplary dielectric-electrode layer of an element array according to an exemplary embodiment of the present disclosure.

FIGS. 10 and 11 show exemplary respective dielectric-electrode layers 204 and 206 that can be used in a four element array according to another exemplary embodiment of the present disclosure. Layer 204 includes a dielectric substrate having four electrodes 230, 231, 232, and 233 thereon. Each electrode 230, 231, 232, and 233, can form a part of an element, such as part of a capacitor, varistor, or resistor, of element array 200. Each electrode 230, 231, 232, and 233 includes a lead for termination to one of the two side surfaces of layer 204. Layer 206 includes a dielectric substrate with a common electrode 240 thereon. Common electrode 240 can form a part of each of the individual elements of element array 200. For instance, in a particular embodiment, common electrode 240 can form an opposing capacitor plate for each of electrodes 230, 231, 232, and 233. Common electrode 240 similarly includes leads 242 and 244 for termination to one of the two side surfaces of layer 206.

Figure 12:
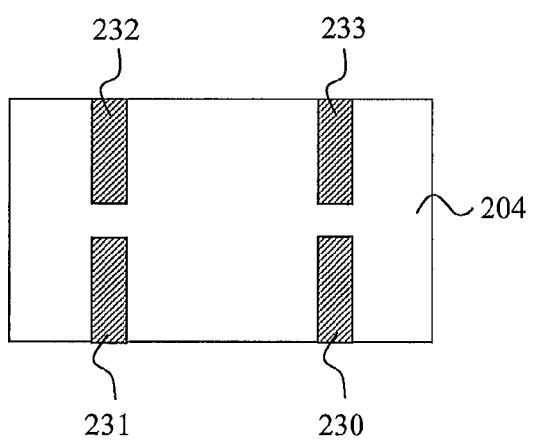
FIG. 12 depicts a top plan view of an exemplary dielectric-electrode layer of an element array according to an exemplary embodiment of the present disclosure.
Figure 13:
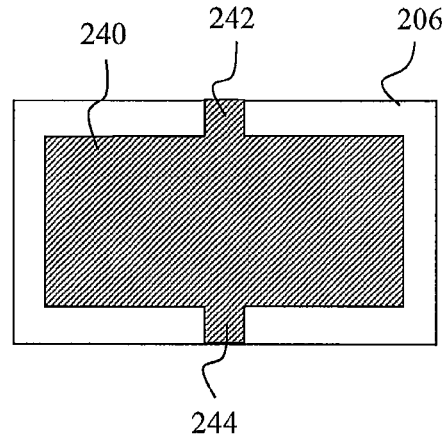
FIG. 13 depicts a top plan view of an exemplary dielectric-electrode layer of an element array according to an exemplary embodiment of the present disclosure.

FIGS. 12 and 13 show exemplary respective dielectric-electrode layers 204 and 206 that can be in a four element array according to yet another exemplary embodiment of the present disclosure. Layer 204 includes a dielectric substrate having four electrodes 230, 231, 232, and 233 thereon. Each electrode 230, 231, 232, and 233, can form a part of an element, such as part of a capacitor, varistor, or resistor, of element array 200. Each electrode 230, 231, 232, and 233 respectively includes a lead for termination to one of the two side surfaces of layer 204. Layer 206 includes a dielectric substrate with a common electrode 240 thereon. Common electrode 240 can form a part of each of the individual elements of element array 200. For instance, in a particular embodiment, common electrode 240 can form an opposing capacitor plate for each of electrodes 230, 231, 232, and 233. Common electrode 240 similarly includes leads 242 and 244 for termination to one of the two side surfaces of layer 206.

Figure 14:
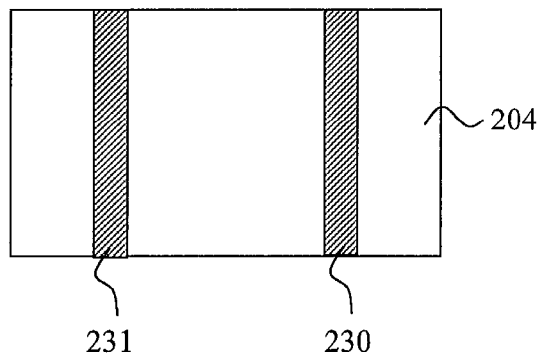
FIG. 14 depicts a top plan view of an exemplary dielectric-electrode layer of an element array according to an exemplary embodiment of the present disclosure.
Figure 15:
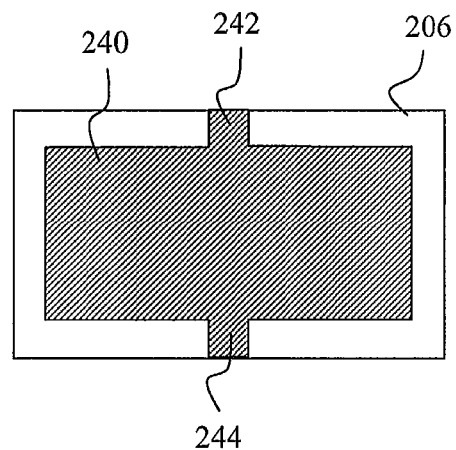
FIG. 15 depicts a top plan view of an exemplary dielectric-electrode layer of an element array according to an exemplary embodiment of the present disclosure.

FIGS. 14 and 15 show exemplary respective dielectric-electrode layers 204 and 206 that can be used in a two element array according to yet another exemplary embodiment of the present disclosure. Layer 204 includes a dielectric substrate having two electrodes 230 and 231 thereon. Each electrode 230 and 231 can form a part of an element, such as part of a capacitor, varistor, or resistor, of element array 200. Each electrode 230 and 231 includes a lead for termination to one of the two side surfaces of layer 204. Layer 206 includes a dielectric substrate with a common electrode 240 thereon. Common electrode 240 can form a part of each of the individual elements of element array 200. For instance, in a particular embodiment, common electrode 240 can form an opposing capacitor plate for each of electrodes 230 and 231. Common electrode 240 similarly includes leads 242 and 244 for termination to one of the two side surfaces of layer 206.

Figure 16:
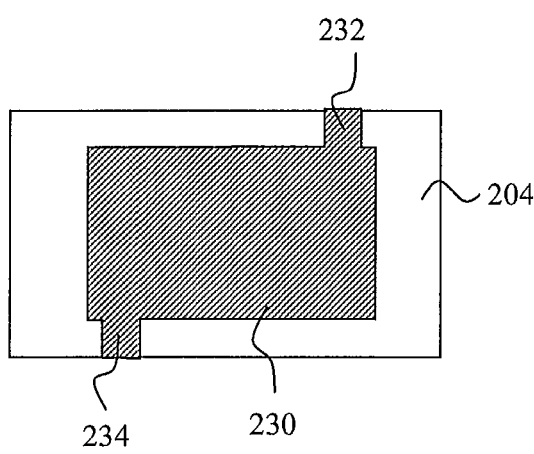
FIG. 16 depicts a top plan view of an exemplary dielectric-electrode layer of an element array according to an exemplary embodiment of the present disclosure.
Figure 17:
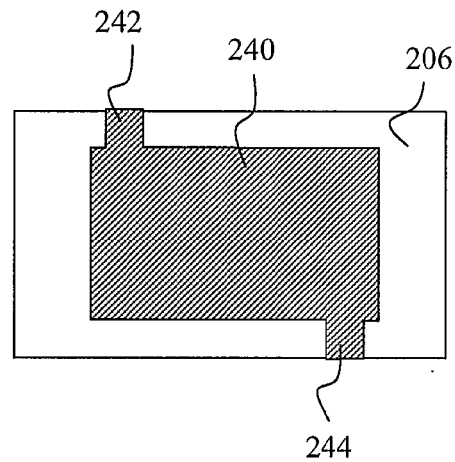
FIG. 17 depicts a top plan view of an exemplary dielectric-electrode layer of an element array according to an exemplary embodiment of the present disclosure.

FIGS. 16 and 17 show exemplary respective dielectric-electrode layers 204 and 206 that can be in a single element array according to yet another exemplary embodiment of the present disclosure. Layer 204 includes a dielectric substrate having electrode 230 thereon. Electrode 230 can be used to form an individual element, such as a capacitor, varistor, or resistor of element array 200. Electrode 230 includes leads 232 and 234 for termination to one of the two side surfaces of layer 204. Layer 206 includes a dielectric substrate with electrode 240 thereon. Electrode 240 can also be used to form an individual element, such as a capacitor, varistor, or resistor of element array 200. Electrode 240 similarly includes leads 242 and 244 for termination to one of the two side surfaces of layer 206.

Figure 18:
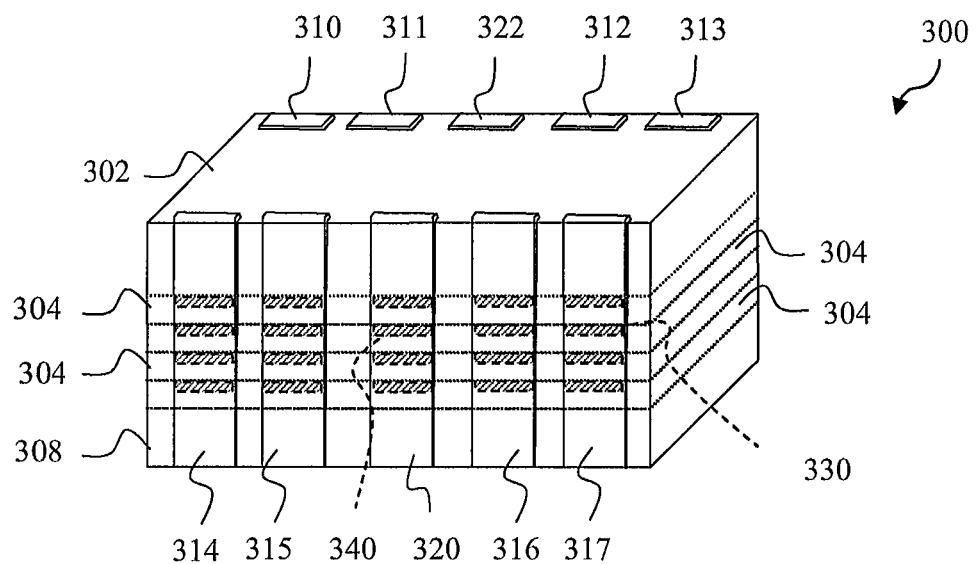
FIG. 18 depicts a perspective view of an element array according to an exemplary embodiment of the present disclosure.
Figure 19:
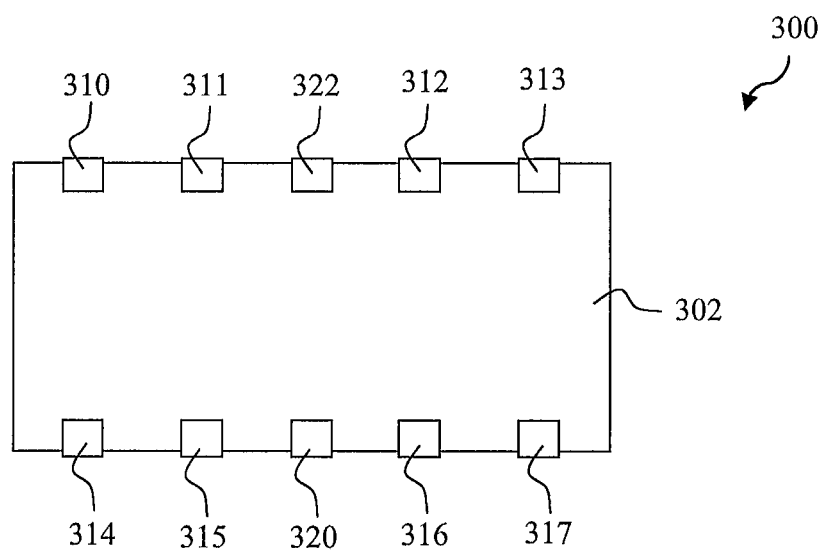
FIG. 19 depicts a top plan view of an element array according to an exemplary embodiment of the present disclosure.
Figure 20:
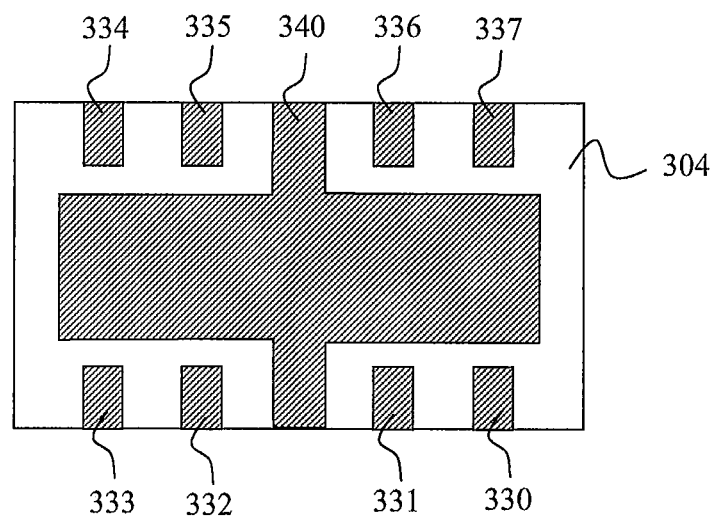
FIG. 20 depicts a top plan view of an exemplary dielectric-electrode layer of an element array according to an exemplary embodiment of the present disclosure.

With reference to FIGS. 18-21, another exemplary element array according to an exemplary embodiment of the present disclosure is discussed. FIG. 18 provides a perspective view of an exemplary element array generally 300 that can be mounted to a printed circuit board. FIG. 19 provides a top plan view of such exemplary element array 300. Element array 300 can be a capacitor array, a varistor array, a resistor array, or other suitable array.

Element array 300 includes a plurality of generally planar dielectric layers made of, for example, a ceramic dielectric material. The dielectric layers can include any suitable dielectric material, such as, for instance, barium titinate, zinc oxide, or other suitable dielectric material. The dielectric layers can be pressed together and sintered to form a unitary structure element array 300.

Element array 300 of FIG. 18 includes a representative top dielectric layer 302, bottom dielectric layer 308, and plural dielectric-electrode layers 304. Element array 300 differs from element array 200 of FIG. 6 in that element array 300 does not include a plurality of alternating dielectric-electrode layers, but rather a plurality of uniform dielectric-electrode layers. While element array 300 includes only a single dielectric layer as top dielectric layer 302 and a single dielectric layer as bottom dielectric layer 308, those of ordinary skill in the art, using the disclosures provided herein, should understand that any number of top or bottom dielectric layers can be used without deviating from the scope of the present disclosure. Similarly, while element array 300 includes four layers of dielectric-electrode layer 304, those of ordinary skill in the art, using the disclosures provided herein, should also understand that the present disclosure is not limited to any particular number of dielectric-electrode layers.

Element array 300 includes a plurality of termination structures 310, 311, 312, 313, 314, 315, 316, 317, 320, and 322 for respectively coupling the internal electrodes of element device 300 to a printed circuit board. The number of termination structures can vary depending on the number of elements in element array 300. For instance, in FIG. 18, ten termination structures are illustrated for an eight element array device. However, fewer termination structures may be necessary for element arrays with fewer than eight elements. For instance, only six termination structures may be necessary for a four element array device.

Similar to element array 200 of FIG. 6, termination structures 310, 311, 312, 313, 314, 315, 316, 317, 320 and 322 are all located on one of the two side surfaces of element array 300. The end surfaces of element array do not include any termination structures. As will be discussed in detail below, such is because the footprint layout for the internal electrodes of element array 300 are configured such that termination structures are only needed at the two side surfaces of element array 300 and not at the two end surfaces of element array 300.

FIG. 18 shows an exemplary dielectric-electrode layer 304 that can be used to produce an eight element array according to exemplary embodiment of the present disclosure. Layer 304 includes a dielectric substrate having eight electrodes 330, 331, 332, 333, 334, 335, 336, and 337 thereon. Layer 304 also includes common electrode 340 printed thereon. Common electrode can form a capacitor plate for a capacitor element respectively formed by each of electrodes 330, 331, 332, 333, 334, 335, 336, and 337. As illustrated, each electrode 330, 331, 332, 333, 334, 335, 336, and 337 includes a lead for termination to one of the two side surfaces of layer 304. Common electrode 340 similarly includes leads for termination to one of the two side surfaces of layer 304.

Figure 21:
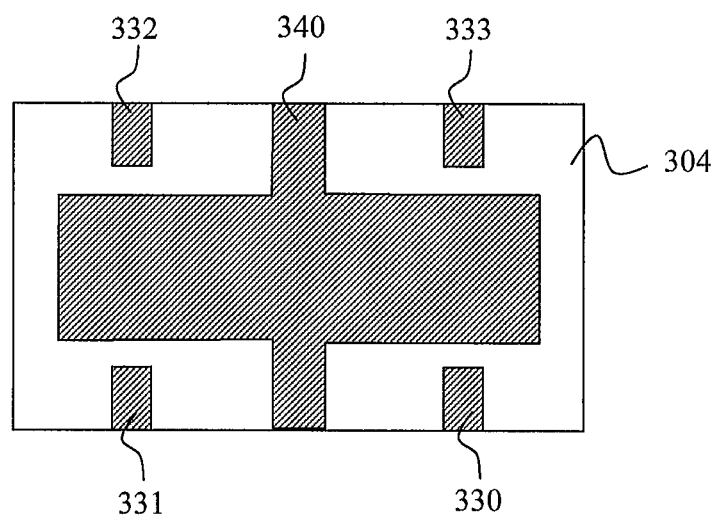
FIG. 21 depicts a top plan view of an exemplary dielectric-electrode layer of an element array according to an exemplary embodiment of the present disclosure.

FIG. 21 shows an exemplary dielectric-electrode layer 304 that can be used to produce a four element array according to an exemplary embodiment of the present disclosure. Layer 304 includes a dielectric substrate having four electrodes 330, 331, 332, and 333 thereon. Layer 304 also includes common electrode 340 printed thereon. Common electrode can form a capacitor plate a capacitor element respectively formed by each of electrodes 330, 331, 332, and 333. As illustrated, each electrode 330, 331, 332, and 333, includes a lead for termination to one of the two side surfaces of layer 304. Common electrode 340 similarly includes leads for termination to one of the two side surfaces of layer 304.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An element array for mounting to a circuit board, the element array having a rectangular configuration defining first and second opposing side surfaces and first and second opposing end surfaces, said element array comprising:
   at least one dielectric layer; and
   a plurality of stacked dielectric-electrode layers, said plurality of stacked dielectric-electrode layers including at least a first dielectric-electrode layer and at least a second dielectric-electrode layer, said first dielectric-electrode layer comprising a plurality of element electrodes, each of said plurality of element electrodes forming a part of an individual element for said element array;
   wherein each of said plurality of element electrodes comprises a lead for termination to one of said first and second opposing side surfaces of said element array, and
   said element array further comprises a plurality of termination structures external to said stacked dielectric-electrode layers for coupling said leads of said element electrodes to a circuit board.

2. An element array as in claim 1, wherein said individual element for said element array comprises one of a capacitor, a varistor, and a resistor.

3. An element array as in claim 1, wherein said element array is a size 1206 element array.

4. An element array as in claim 3, wherein said first dielectric-electrode layer comprises at least eight element electrodes.

5. An element array as in claim 1, wherein said second dielectric-electrode layer includes a common electrode.

6. An element array as in claim 5, wherein said common electrode comprises a shared capacitor plate for said plurality of element electrodes.

7. An element array as in claim 5, wherein said common electrode comprises at least one lead for termination to one of said first and second opposing end surfaces of said element array.

8. An element array as in claim 5, wherein said common electrode comprises at least one lead for termination to one of said first and second opposing side surfaces of said element array.

9. An element array as in claim 1, wherein said first dielectric-electrode layer includes a common electrode.

10. An element array as in claim 9, wherein said common electrode comprises at least one lead for termination to one of said first and second opposing side surfaces of said element array.

11. An element array as in claim 1, wherein said element array has an aspect ratio of less than 1:1.

* * * * *